(12) United States Patent
Kuzuhara et al.

(10) Patent No.: US 12,352,940 B2
(45) Date of Patent: *Jul. 8, 2025

(54) OPTICAL SYSTEM

(71) Applicant: Panasonic Intellectual Property Management Co., Ltd., Osaka (JP)

(72) Inventors: Satoshi Kuzuhara, Osaka (JP); Tsuneo Uchida, Chiba (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 667 days.

This patent is subject to a terminal disclaimer.

(21) Appl. No.: 17/404,468

(22) Filed: Aug. 17, 2021

(65) Prior Publication Data

US 2021/0373305 A1 Dec. 2, 2021

Related U.S. Application Data

(63) Continuation of application No. PCT/JP2020/016169, filed on Apr. 10, 2020.

(30) Foreign Application Priority Data

Apr. 12, 2019 (JP) ................................ 2019-076468

(51) Int. Cl.
*G02B 5/04* (2006.01)
*G02B 17/00* (2006.01)
(Continued)

(52) U.S. Cl.
CPC ........... *G02B 17/0856* (2013.01); *G02B 5/04* (2013.01); *G02B 17/004* (2013.01); *G02B 26/105* (2013.01); *G02B 27/0025* (2013.01)

(58) Field of Classification Search
CPC .. G02B 17/0856; G02B 17/004; G02B 17/08; G02B 17/04; G02B 5/04; G02B 26/105;
(Continued)

(56) References Cited

U.S. PATENT DOCUMENTS 5,689,736 A * 11/1997 Okuyama ............. G03B 13/06
250/221
2004/0136041 A1* 7/2004 Togino ................. G02B 26/108
359/834

(Continued)

FOREIGN PATENT DOCUMENTS

EP  1 584 966      10/2005
JP  08-234136       9/1996
(Continued)

OTHER PUBLICATIONS

Extended European Search Report issued May 11, 2022 in corresponding European Patent Application No. 20787636.8.
(Continued)

*Primary Examiner* — Wyatt A Stoffa
*Assistant Examiner* — Samanvitha Sridhar
(74) *Attorney, Agent, or Firm* — Wenderoth, Lind & Ponack, L.L.P.

(57) ABSTRACT

The present disclosure provides an optical system that includes a prism having an incident surface, an exit surface, and one or more reflecting surfaces. A first intermediate imaging position of a light flux in a first direction is located inside the prism. The first intermediate imaging position is different from a second intermediate imaging position of the light flux in a second direction orthogonal to the first direction.

20 Claims, 7 Drawing Sheets

(51) Int. Cl.
  *G02B 17/08* (2006.01)
  *G02B 26/10* (2006.01)
  *G02B 27/00* (2006.01)

(58) Field of Classification Search
  CPC .............. G02B 26/101; G02B 27/0025; G02B 27/0911; G02B 27/0972; G02B 27/126; G02B 27/104; G02B 27/0031; G02B 13/10; G02B 13/0065; G02B 13/007; G02B 19/0028; G02B 19/0052; G02B 13/0005; G02B 27/0955; G02B 27/0966
  See application file for complete search history.

(56) References Cited

U.S. PATENT DOCUMENTS

| | | | | |
|---|---|---|---|---|
| 2014/0185021 | A1* | 7/2014 | Yamagiwa | G03B 21/2033 353/121 |
| 2015/0061975 | A1* | 3/2015 | Komatsu | G02B 27/0172 345/8 |
| 2015/0216408 | A1 | 8/2015 | Brown et al. | |
| 2018/0129053 | A1* | 5/2018 | Morrison | G02B 27/0966 |
| 2021/0173199 | A1* | 6/2021 | Suzuki | G02B 26/101 |
| 2023/0047387 | A1* | 2/2023 | Kuzuhara | G02B 5/04 |

FOREIGN PATENT DOCUMENTS

| | | |
|---|---|---|
| JP | 2001-4955 | 1/2001 |
| JP | 2001004955 A * | 1/2001 |
| JP | 2001-194617 | 7/2001 |
| JP | 2006-153967 | 6/2006 |
| JP | 2006-276816 | 10/2006 |
| JP | 2007-047243 | 2/2007 |
| JP | 2007-094121 | 4/2007 |
| JP | 2007094121 A * | 4/2007 |
| JP | 2014-035395 | 2/2014 |
| JP | 2015-072437 | 4/2015 |
| JP | 2018-108400 | 7/2018 |

OTHER PUBLICATIONS

Office Action issued Jan. 16, 2024 in corresponding Japanese Patent Application No. 2021-513723, with Machine translation.
Translation of the International Preliminary Report on Patentability issued Oct. 14, 2021 in International Application No. PCT/JP2020/016169.
Office Action issued Sep. 9, 2023 in corresponding Chinese Patent Application No. 202080007633.9, with machine translation.
Office Action issued May 23, 2024 in European Patent Application No. 20 787 636.8.
International Search Report issued Jun. 30, 2020 in International (PCT) Application No. PCT/JP2020/016169.

* cited by examiner

OPTICAL SYSTEM

CROSS-REFERENCE TO RELATED APPLICATIONS

This is a continuation application of International Application No. PCT/JP2020/016169, with an international filing date of Apr. 10, 2020, which claims priority of Japanese Patent Application No.2019-076468 filed on Apr. 12, 2019, the content of which is incorporated herein by reference.

TECHNICAL FIELD

The present disclosure relates to an optical system using a prism.

BACKGROUND

JP 2018-108400 A discloses an optical system having a scanning device that scans in two directions. It is described that this optical system transmits a scanned laser using a mirror. When the laser is transmitted using the mirror, since there is a layer of air between mirrors, it is difficult to reduce the size of the optical system.

SUMMARY

When a space between mirrors is filled with medium of prism, in order to downsize an optical system, there is a risk of leading to loss of laser light in a case where there is a scratch or dust in the prism at an imaging point of a light incident on the prism.

The present disclosure provides an optical system capable of reducing the size and an influence of a scratch in the prism.

An optical system according to the present disclosure includes a prism having an incident surface, an exit surface, and one or more reflecting surfaces. A first intermediate imaging position of a light flux in a first direction is located inside the prism. The first intermediate imaging position is different from a second intermediate imaging position of a light flux in a second direction orthogonal to the first direction.

An optical system according to the present disclosure includes a prism having an incident surface, an exit surface, and one or more reflecting surfaces. A first intermediate imaging position of a light flux in a first direction is located inside the prism. The light flux in a second direction orthogonal to the first direction does not form an intermediate image.

A prism of the present disclosure can be downsized and can reduce an influence of a scratch in the prism.

DETAILED DESCRIPTION

Hereinafter, embodiments will be described in detail with reference to the drawings as appropriate. However, unnecessarily detailed description may be omitted. For example, a detailed description of a well-known matter and a repeated description of substantially the same configuration may be omitted. This is to avoid unnecessary redundancy in the following description and to facilitate understanding of those skilled in the art.

Note that the inventor (s) provides the accompanying drawings and the following description in order for those skilled in the art to fully understand the present disclosure, and does not intend to limit the subject matter described in the claims by the accompanying drawings and the following description.

First Embodiment

The first embodiment will be described below with reference to FIGS. 1 to 6. In the present embodiment, as illustrated in FIG. 2, for example, an X direction is a long diameter direction of a pupil diameter 11a of a laser light R emitted from a laser element 11, and a Y direction is a short diameter direction of the pupil diameter 11a of the laser light R emitted from the laser element 11. The X direction and the Y direction are orthogonal to each other, and a direction orthogonal to an XY plane is a Z direction.

1-1. Configuration

Figure 1:
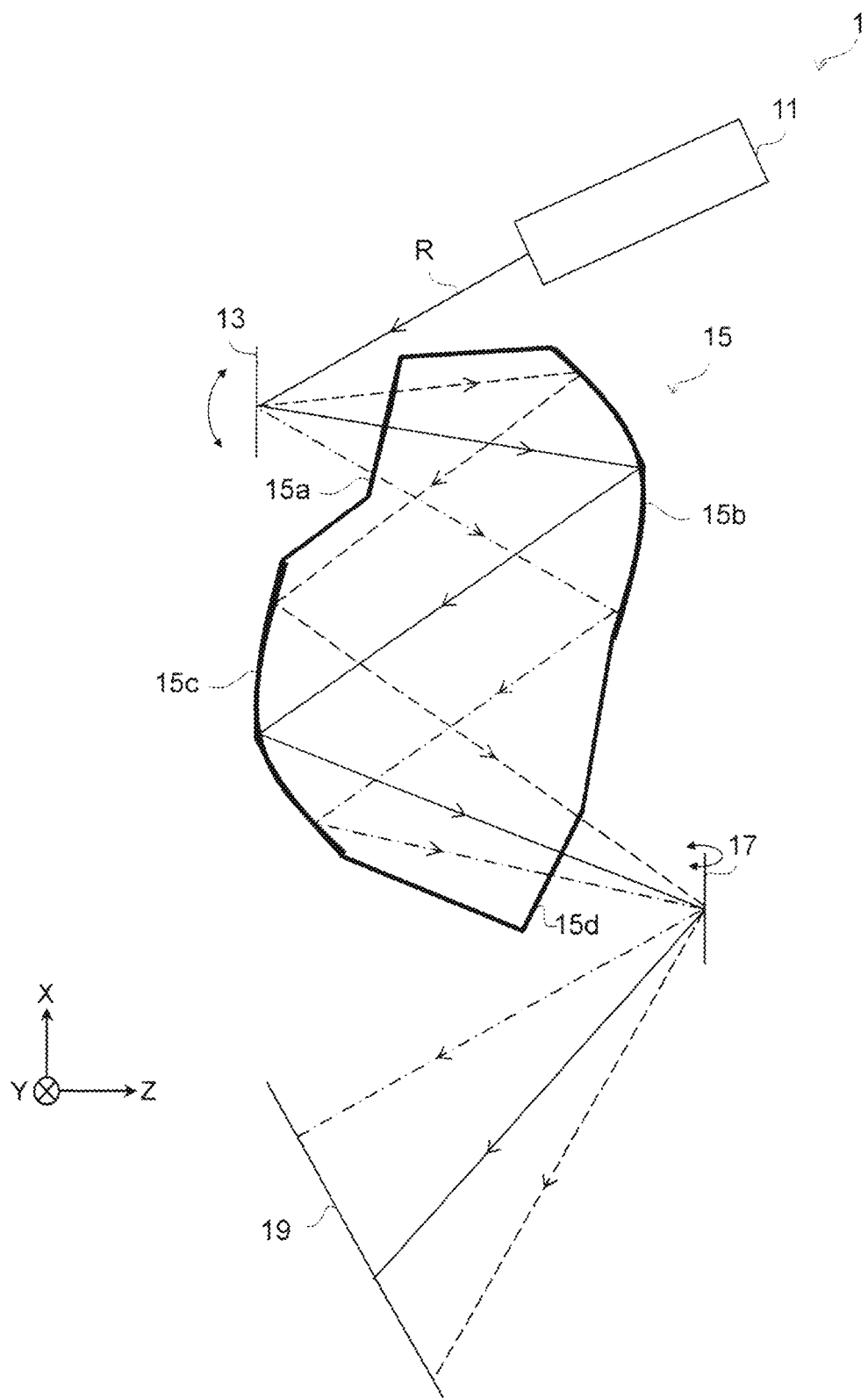
FIG. 1 is a cross-sectional view illustrating a configuration of an optical system according to a first embodiment.
Figure 2:
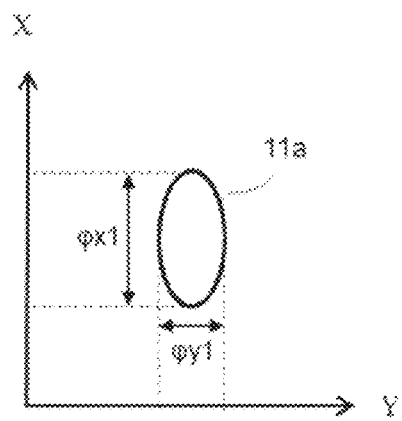
FIG. 2 is a diagram illustrating a pupil diameter of a laser light immediately after irradiation from a laser element in the first embodiment.

FIG. 1 is a cross-sectional view illustrating a configuration of an optical system 1 according to the present disclosure. The optical system 1 includes a laser element 11, a first scanning element 13, a prism 15, and a second scanning element 17.

The laser element 11 is, for example, a semiconductor laser. The laser emitted from the laser element 11 is a parallel light having different pupil diameters in the X direction and the Y direction. For example, as illustrated in FIG. 2, the pupil diameter 11a of a laser light R immediately after irradiation from the laser element 11 has an elliptical shape extending in the X direction. The laser light R emitted from the laser element 11 is scanned in the X direction by the first scanning element 13 and is incident on an incident surface 15a of the prism 15.

The first scanning element 13 scans the incident laser light in the X direction as the first direction. The first scanning element 13 is, for example, a mirror that is rotationally driven by piezoelectric driving in the Y direction as a rotation axis. The first scanning element is, for example, a scanner in a vertical direction. As a result, the parallel light is diffused in the X direction.

The prism 15 has the incident surface 15a and an exit surface 15d. The prism 15 further has one or more reflecting surfaces in an optical path from the incident surface 15a to the exit surface 15d. In the present embodiment, for example, the prism 15 has a first reflecting surface 15b and a second reflecting surface 15c. The incident surface 15a and the exit surface 15d have, for example, a flat plate shape. The prism 15 is made of, for example, resin or glass.

The incident surface 15a faces the first scanning element 13, and the laser light R scanned in the X direction by the first scanning element 13 is incident on the prism 15 through the incident surface 15a. The incident surface 15a and the first reflecting surface 15b face each other, and the laser light incident from the incident surface 15a is reflected by the first reflecting surface 15b into the prism 15.

The laser light reflected by the first reflecting surface 15b is reflected again into the prism 15 by the second reflecting surface 15c disposed facing the exit surface 15d. The laser light reflected by the second reflecting surface 15c travels to the exit surface 15d and exits from the exit surface 15d to the outside of the prism 15.

The first reflecting surface 15b and the second reflecting surface 15c have different curvatures in the X direction as the first direction and the Y direction as a second direction, respectively. Therefore, the first reflecting surface 15b and the second reflecting surface 15c have a free-form surface shape.

Still more, each of the first reflecting surface 15b and the second reflecting surface 15c is eccentric to the incident light. This makes it possible to separate the optical path of the incident light without using an optical element such as a beam splitter. Further, each of the first reflecting surface 15b and the second reflecting surface 15c has a concave shape with respect to the incident light.

The second scanning element 17 scans the laser light exiting from the prism 15 in the Y direction and projects the laser light on a projection surface 19. The second scanning element 17 is, for example, a mirror that is rotationally driven by piezoelectric driving in the X direction as a rotation axis. The second scanning element 17 is, for example, a horizontal scanner. The second scanning element 17 scans in synchronization with the first scanning element 13 so that a two-dimensional image can be projected on the projection surface 19.

In the optical system 1 according to the present embodiment, the first scanning element 13, the incident surface 15a of the prism 15, the first reflecting surface 15b of the prism 15, the second reflecting surface 15c of the prism 15, the exit surface 15d of the prism 15, and the second scanning element 17 are arranged in order of the optical path from the laser element 11. Therefore, the prism 15 is disposed in the optical path from first scanning element 13 to second scanning element 17.

Figure 3:
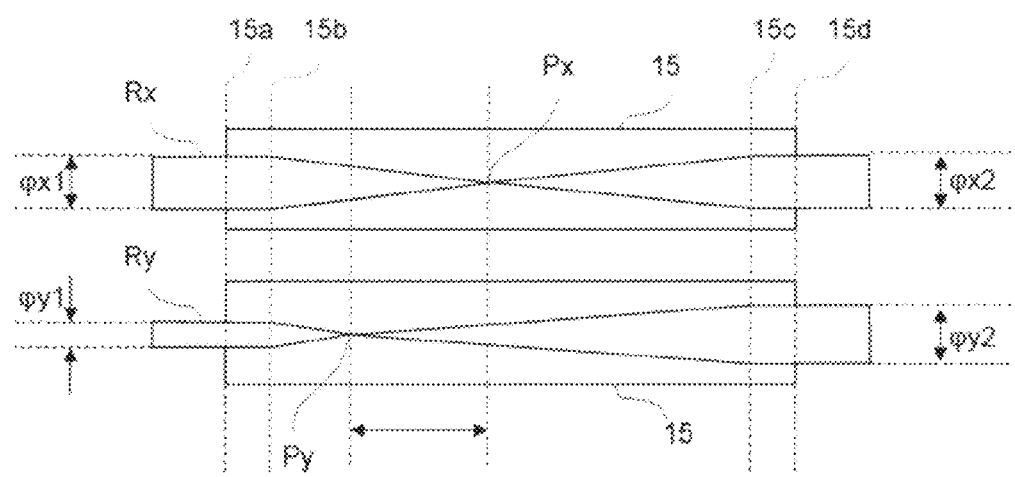
FIG. 3 is a diagram illustrating intermediate imaging positions of an X component and a Y component of the laser light.

As illustrated in FIG. 3, the optical system 1 has an intermediate imaging position Px in the X direction of the light flux of the laser light R between the first reflecting surface 15b in the prism 15 and the second reflecting surface 15c in the prism 15. The intermediate imaging position Px does not intersect at the same position with the light flux of the laser light R in the Y direction orthogonal to the X direction. Therefore, a pupil diameter 11c of the laser light R at the intermediate imaging position Px has a linear shape.

Still more, since focal lengths of Rx that is a component of the laser light R in the X direction, and Ry that is a component of the laser light R in the Y direction are also different, the intermediate imaging position Px of the X component Rx and the intermediate imaging position Py of the Y component Ry of the laser light R are different. Further, since focal lengths of the X component Rx and the Y component Ry are different from each other, magnification ratios at the time of emission from the exit surface 15d of the prism 15 are also different from each other. In other words, the optical system 1 has different optical magnifications in the X direction and the Y direction. For example, in the present embodiment, since the focal length in the Y direction is longer than that in the X direction, the optical magnification in the Y direction is larger than that in the X direction.

Figure 4:
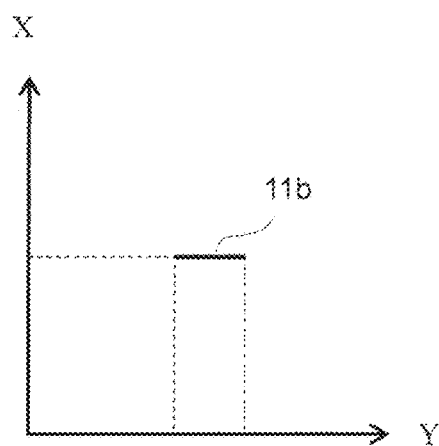
FIG. 4 is a diagram illustrating a pupil diameter of the laser light at an intermediate imaging position (Px).

The intermediate imaging position Px of the X component Rx of the laser light R is not located at the same position as the intermediate imaging position Py of the Y component Ry of the laser light R. As a result, as illustrated in FIG. 4, a pupil diameter 11b of the laser light R at the intermediate imaging position Px has a linear shape extending in the Y direction. This makes it possible to prevent loss of the pupil diameter 11b of the laser light R when dust or scratch exists at the intermediate imaging position Px.

Figure 5:
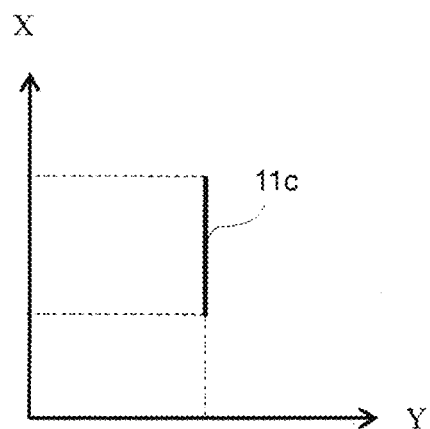
FIG. 5 is a diagram illustrating a pupil diameter of the laser light at an intermediate imaging position (Py).
Figure 6:
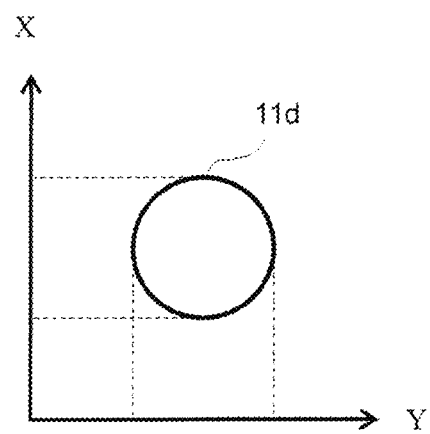
FIG. 6 is a diagram illustrating a pupil diameter of the laser light exiting from a prism.

Further, as illustrated in FIG. 5, at the intermediate imaging position Py of the Y component Ry of the laser light R, the pupil diameter 11c of the laser light R exists before the X component Rx of the laser light R forms an image. In this manner, the pupil diameter 11c of the laser light R at the intermediate imaging position Py also has a linear shape extending in the X direction. Since an optical magnification of the optical system 1 is larger in the Y direction than in the X direction, a pupil diameter 11d of the laser light R exiting from the exit surface 15d is formed in a circular shape as illustrated in FIG. 6.

A relationship between a first exit pupil diameter $\varphi x1$ in the X direction and a second exit pupil diameter $\varphi y1$ in the Y direction of the light emitted from the laser element 11, and a first projection pupil diameter $\varphi x2$ in the X direction and a second projection pupil diameter $\varphi y2$ in the Y direction of the light passing through the exit surface 15d of the prism 15 and reaching the projection surface 19 is as follows:

$0.1 < (\varphi x1 \times \varphi y1)/(\varphi x2 \times \varphi y2) < 0.8$. By satisfying this relationship, spot sizes at the intermediate imaging positions Px and Py increase, and an influence of dust or scratch inside the prism 15 can be effectively reduced.

Figure 7:
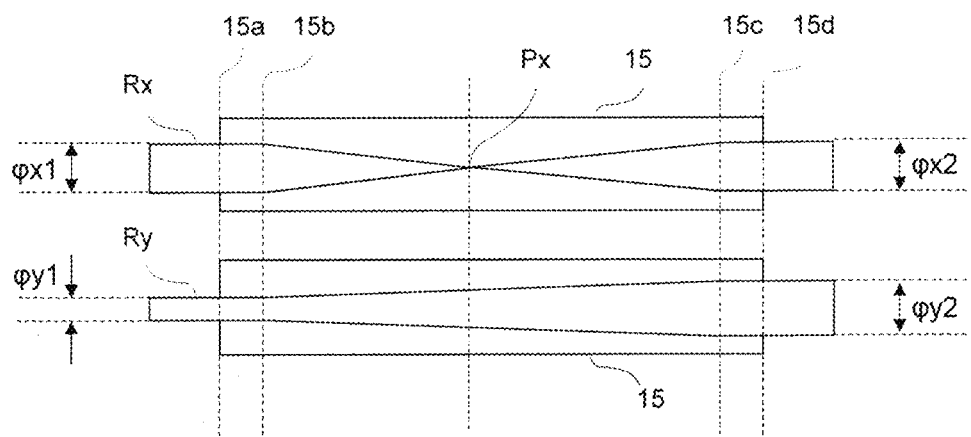
FIG. 7 is a diagram illustrating an intermediate imaging position of the X component of the laser light.

In the present embodiment, the optical system 1 has the intermediate imaging position Py in the Y direction. However, as illustrated in FIG. 7, the optical system 1 may be configured not to have an intermediate imaging action in the Y direction and there is no intermediate imaging position Py. In this case, a curvature of the first reflecting surface 15b may be designed such that the Y component Ry of the laser light R reflected by the first reflecting surface 15b gradually increases.

The present embodiment is configured with a combination of the first scanning element 13 that is a scanner in the vertical direction and the second scanning element 17 that is a scanner in the horizontal direction. However the present embodiment may be configured with the first scanning element 13 that is a scanner in the horizontal direction and the second scanning element 17 that is a scanner in the vertical direction.

In the present embodiment, the prism 15 has two reflecting surfaces that are the first reflecting surface 15b and the second reflecting surface 15c. However, the prism 15 may have only the first reflecting surface 15b or at least two or more reflecting surfaces.

1-2. Effects

The optical system 1 according to the first embodiment includes the prism 15 having the incident surface 15a, the exit surface 15d, and one or more reflecting surfaces 15b and 15c. The intermediate imaging position Px of the X component Rx of the laser light R, which is the light flux in the X direction, is located the prism 15. The intermediate imaging position Px is different from the intermediate imaging position Py of the Y component Ry of the laser light R, which is the light flux in the Y direction orthogonal to the X direction. Therefore, even when there is a scratch, dust, or the like at the intermediate imaging position Px of the X component Rx of the laser light R, the intermediate imaging position Px has a shape extending in the Y direction, so that it is possible to prevent loss of the pupil diameter 11b of the laser light R and to reduce the influence of the scratch or dust. In addition, even when there is a scratch, dust, or the like at the intermediate imaging position Py of the Y component Ry of the laser light R, the intermediate imaging position Py has a shape extending in the X direction, so that it is possible to prevent loss of the pupil diameter 11c of the laser light R and to reduce the influence of the scratch or dust. In addition, by passing the laser light R through the prism, the optical path length can be shortened by the refractive index of the prism 15 to downsize the optical system 1.

The optical system 1 according to the first embodiment further includes the first scanning element 13 that scans an incident light in the X direction, and the second scanning element 17 that scans the incident light in the Y direction. The prism 15 is disposed in the optical path from the first scanning element 13 to the second scanning element 17. The first scanning element 13 scans light in the direction of the light flux in the X direction, and the second scanning element 17 scans light in the direction of the light flux in the Y direction, so that the optical magnification can be adjusted in accordance with the scanning direction.

Second Embodiment

Next, the second embodiment will be described with reference to FIGS. 8.

2-1. Configuration

Figure 8:
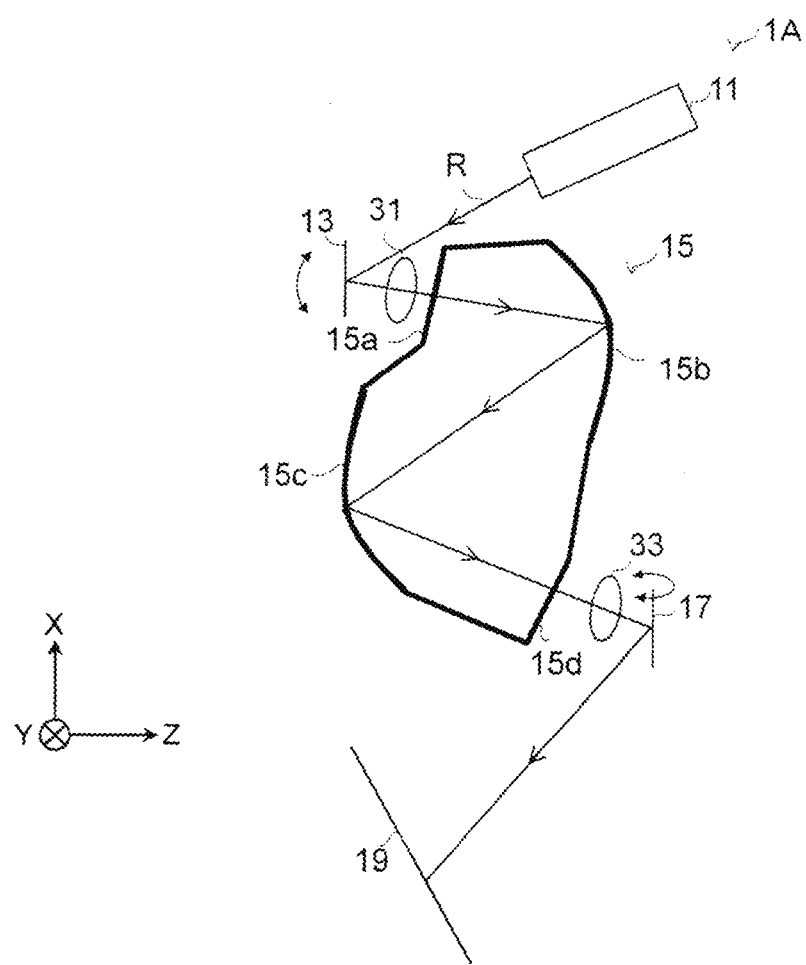
FIG. 8 is a cross-sectional view illustrating a configuration of an optical system according to a second embodiment.

FIG. 8 is a diagram illustrating a configuration of an optical system 1A according to the second embodiment. As illustrated in FIG. 8, the optical system 1A of the present embodiment further includes an astigmatism correcting element 31 and a diopter correcting element 33 in the optical system 1 of the first embodiment. The configuration other than these differences is common between the optical system 1 according to the first embodiment and the optical system 1A of the present embodiment.

The astigmatism correcting element 31 is disposed on an optical path before light enters to or after the light exits from the prism 15. In the present embodiment, the astigmatism correcting element 31 is disposed on the optical path between the first scanning element 13 and the incident surface 15a of the prism 15. The astigmatism correcting element 31 is an element having a curvature in the Y direction and having substantially no curvature in the X direction. In the astigmatism correcting element 31, a refractive power in a direction (Y direction) perpendicular to a scanning direction is larger than a refractive power in the scanning direction (X direction) of the first scanning element 13.

The astigmatism correcting element 31 has, for example, a cylindrical shape, a toroidal shape, a free-form surface shape, or a combination of these shapes. The astigmatism correcting element 31 may be a lens or a mirror. The astigmatism correcting element 31 is, for example, a cylindrical lens.

The diopter correcting element 33 is disposed on the optical path before light enters to or after the light exits from the prism 15. In the present embodiment, the diopter correcting element 33 is disposed on an optical path between the exit surface 15d of the prism 15 and the second scanning element 17. Since the diopter correcting element 33 has rotationally symmetric refractive power, it is possible to adjust a resolution in both the X direction and the Y direction by moving along the optical path. Therefore, the resolution in the X direction and the Y direction can be adjusted by moving along the optical path of the laser light R exiting from the exit surface 15d. The diopter correcting element 33 is, for example, a spherical lens or an aspherical lens.

Figure 9:
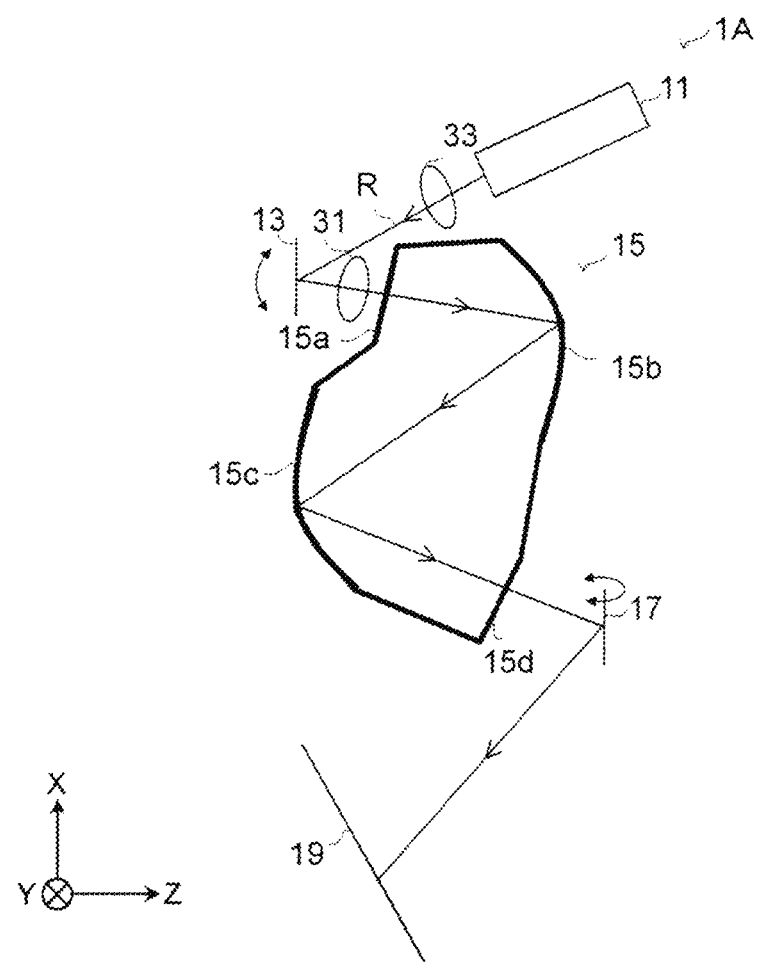
FIG. 9 is a cross-sectional view illustrating a configuration of an optical system in a modified example of the second embodiment.
Figure 10:
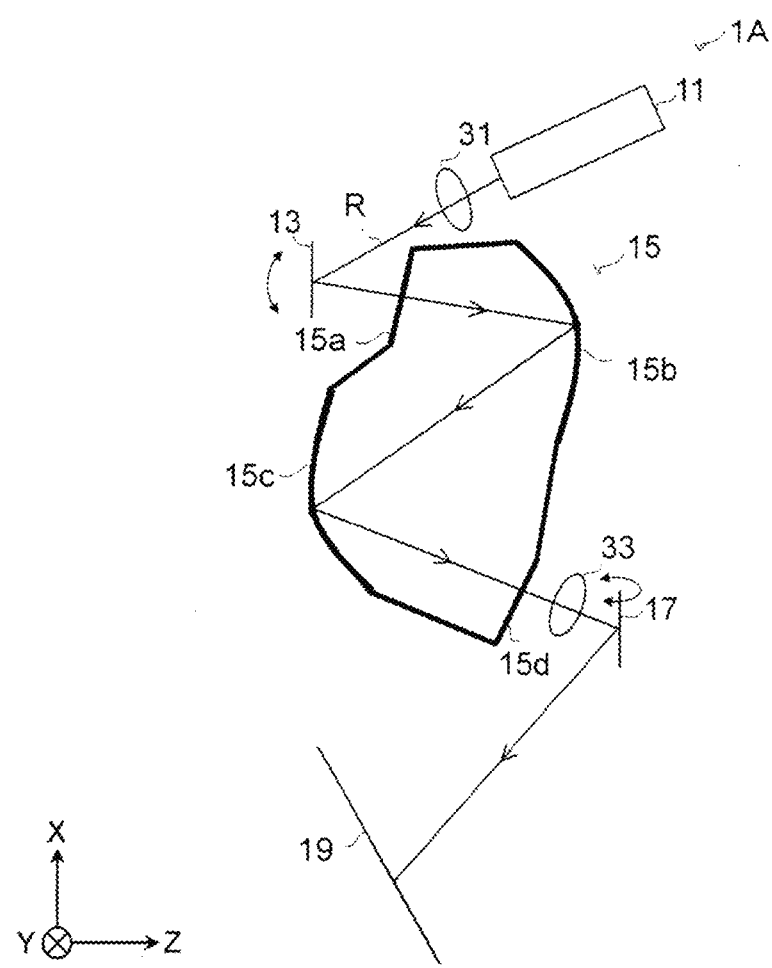
FIG. 10 is a cross-sectional view illustrating a configuration of an optical system in a modified example of the second embodiment.
Figure 11:
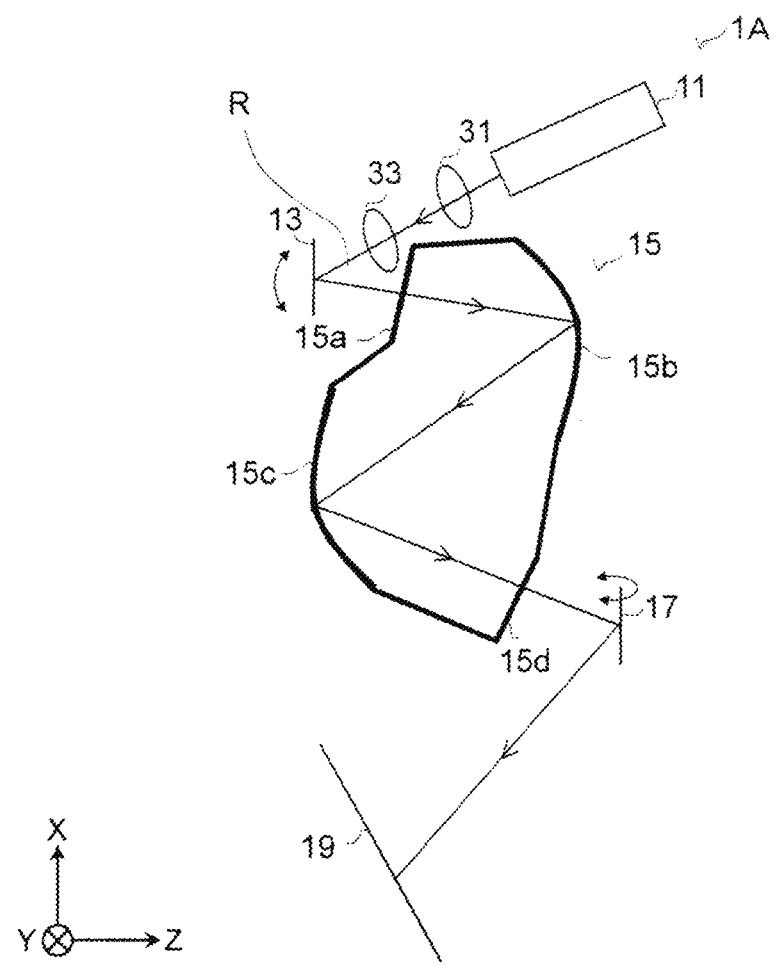
FIG. 11 is a cross-sectional view illustrating a configuration of an optical system in a modified example of the second embodiment.

Note that an arrangement of the astigmatism correcting element 31 and the diopter correcting element 33 is not limited to the example illustrated in FIG. 8. For example, as illustrated in FIG. 9, the diopter correcting element 33 may be disposed on an optical path between the laser element 11 and the first scanning element 13. Still more, as illustrated in FIG. 10, the astigmatism correcting element 31 may be disposed on an optical path between the laser element 11 and the first scanning element 13. Furthermore, as illustrated in FIG. 11, the astigmatism correcting element 31 and the diopter correcting element 33 may be disposed on the optical path between the laser element 11 and the first scanning element.

Note that, due to an action of the astigmatism correcting element 31, even in a case where the intermediate imaging position in the Y direction is located between the first scanning element and the incident surface 15a of the prism 15, although there is a scratch, dust, or the like at any point of the intermediate imaging position Px of the X component Rx of the laser light R, loss of the X component of the laser light R can be prevented and an effect of reducing the influence of the scratch or dust can be obtained.

2-2. Effects

Since the optical system 1A including the astigmatism correcting element 31 can adjust the resolution in either the X direction or the Y direction, shift in the resolution in the X direction or the Y direction can be corrected by moving along the optical path of the laser light R exiting from the exit surface 15d.

Other Embodiments

As described above, the first and second embodiments have been described as examples of the technique disclosed in the present disclosure. However, the technique in the present disclosure is not limited thereto, and can also be applied to embodiments in which changes, replacements, additions, omissions, and the like are made. In addition, it is also possible to combine the components described in the first and second embodiments to form a new embodiment.

In the first and second embodiments, the laser light R emitted from the laser element 11 is scanned in the X direction and the Y direction by the first scanning element 13 and the second scanning element 17, respectively, to project an image, but the present disclosure is not limited thereto. A display element 41 may be disposed instead of the laser element 11, and the first scanning element 13 and the second scanning element 17 may be omitted.

Figure 12:
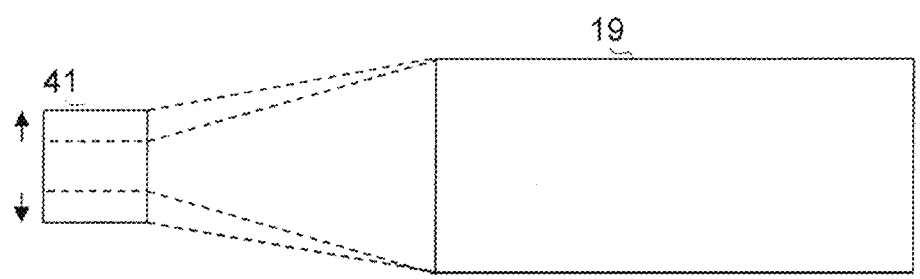
FIG. 12 is an explanatory diagram illustrating improvement in resolution.

According to this embodiment, as illustrated in FIG. 12, the resolution of the display element 41 can be increased to project an image on the projection surface 19. In addition, a rate of increasing the resolution in each of the X direction and the Y direction can be changed.

As described above, the embodiments have been described as examples of the technique in the present disclosure. For this purpose, the accompanying drawings and the detailed description have been provided. Therefore, the components described in the accompanying drawings and the detailed description may include not only components essential for solving the problem but also components that are not essential for solving the problem in order to illustrate the above technique. Therefore, it should not be immediately recognized that these non-essential components are essential based on the fact that these non-essential components are described in the accompanying drawings and the detailed description.

In addition, since the above-described embodiments are intended to illustrate the technique in the present disclosure, various changes, replacements, additions, omissions, and the like can be made within the scope of the claims or equivalents thereof.

Outline of Embodiments (1) An optical system of the present disclosure includes a prism having an incident surface, an exit surface, and one or more reflecting surfaces. A first intermediate imaging position of a light flux in a first direction is located inside the prism. The first intermediate imaging position is different from a second intermediate imaging position of the light flux in a second direction orthogonal to the first direction.

As described above, in the prism, since the first intermediate imaging position of the light flux in the first direction is not located at the second intermediate imaging position of the light flux in the second direction, even when there is a scratch or dust in a part of the first intermediate imaging position of the light flux in the first direction in the prism, an influence on the light flux in the first direction can be reduced. In addition, since an optical path can be shortened by using the prism as compared with using the mirror, the optical system can be downsized.

(2) An optical system of the present disclosure includes a prism having an incident surface, an exit surface, and one or more reflecting surfaces. A first intermediate imaging position of a light flux in a first direction is located inside the prism. The light flux in a second direction orthogonal to the first direction does not form an intermediate image.

As described above, in the prism, since the intermediate imaging position of the light flux in the first direction is not located at the intermediate imaging position of the light flux in the second direction, even when there is a scratch or dust in a part of the intermediate imaging position of the light flux in the first direction in the prism, an influence on the light flux in the first direction can be reduced. In addition, since an optical path can be shortened by using the prism as compared with using the mirror, the optical system can be downsized.

(3) The optical system according to (1) or (2) includes a first scanning element that scans the incident light in the first direction and a second scanning element that scans the incident light in the second direction, and the prism is disposed in an optical path from the first scanning element to the second scanning element.

(4) In the optical system according to any one of (1) to (3), an optical magnification in the first direction is different from an optical magnification in the second direction. Therefore, the magnification of the light flux exiting from the prism can be changed in each of the first direction and the second direction.

(5) In the optical system according to any one of (1) to (4), a focal length is longer in the second direction than in the first direction.

(6) In the optical system according to any one of (1) to (5), the reflecting surface of the prism has different curvatures in the first direction and the second direction.

(7) In the optical system according to any one of (1) to (6), the reflecting surface of the prism is eccentric with respect to the incident light.

(8) In the optical system according to any one of (1) to (7), the prism has at least two reflecting surfaces.

(9) In the optical system according to (8), at least two reflecting surfaces have a concave shape with respect to the incident light.

(10) In the optical system according to any one of (1) to (9), the optical system does not form an intermediate imaging action in the second direction.

(11) The optical system according to any one of (1) to (10) further includes a laser element that emits a laser light to the incident surface of the prism.

(12) In the optical system according to (11), the laser emitted by the laser element has different pupil diameters in the first direction and the second direction.

(13) In the optical system according to (11) or (12), a relationship is $0.1 < (\varphi x1 \times \varphi y1)/(\varphi x2 \times \varphi y2) < 0.8$ between the first exit pupil diameter $\varphi x1$ in the first direction and the second exit pupil diameter $\varphi y1$ in the second direction of the light emitted from the laser element, and the first projection pupil diameter $\varphi x2$ in the first direction and the second projection pupil diameter $\varphi y2$ in the second direction of the light passing through the exit surface of the prism and reaching the projection surface.

(14) In the optical system according to (3), an astigmatism correcting element is disposed on an optical path before light enters to or after the light exits from the prism, and the reflecting surface of the prism has different curvatures in the first direction and the second direction.

(15) In the optical system according to (14), the astigmatism correcting element has a refractive power in the direction perpendicular to a scanning direction is larger than a refractive power in the scanning direction of the first scanning element.

(16) In the optical system according to (14) or (15), the astigmatism correcting element has a cylindrical shape, a toroidal shape, a free-form surface shape, or a combination of these shapes.

(17) In the optical system according to (16), the astigmatism correcting element is a lens.

(18) In the optical system according to (16), the astigmatism correcting element is a mirror.

(19) The optical system according to (16) includes a diopter correcting element disposed on an optical path before light enters to or after the light exits from the prism.

(20) In the optical system according to (19), the diopter correcting element has rotationally symmetric refractive power.

(21) The optical system according to (16) includes a laser element that emits a laser light to the incident surface of the prism.

(22) In the optical system according to (19), the diopter correcting element is disposed on an optical path from the laser element to the first scanning element.

(23) In the optical system according to (20) or (22), the diopter correcting element is a spherical lens or an aspherical lens.

(24) In the optical system according to any one of (14) to (23), the reflecting surface of the prism is eccentric with respect to the incident light.

The present disclosure is applicable to an optical apparatus employing a refractive optical system such as a prism.

EXPLANATIONS OF LETTERS OR NUMERALS

1 Optical system
11 Laser element
11a Pupil diameter
13 First scanning element
15 Prism
15a Incident surface
15b First reflecting surface
15c Second reflecting surface
15d Exit surface
17 Second scanning element
19 Projection surface
31 Astigmatism correcting element
33 Diopter correcting element
41 Display element

The invention claimed is:

1. An optical system comprising:
a prism having an incident surface, an exit surface, and one or more reflecting surfaces;
a laser element configured to emit a laser light,
a first scanning element configured to scan the laser light emitted by the laser element in a first direction and emit to the incident surface of the prism,
a second scanning element disposed at a position where the laser light scanned by the first scanning element is emitted from the exit surface of the prism and concentrated, and configured to scan the laser light incident from the exit surface of the prism in the second direction,
wherein
a long diameter direction of a pupil diameter of the laser light emitted from the laser element corresponds to the first direction of the first scanning element,
a short diameter direction of the pupil diameter of the laser light emitted from the laser element corresponds to the second direction of the second scanning element,
the long diameter direction and the short diameter direction are orthogonal to each other,
the reflecting surfaces have different curvatures depending on a scanning direction of the first and the second scanning elements so that the pupil diameter of the laser light in the second direction approaches the pupil diameter in the first direction at the exit surface,
an optical magnification of the prism in the second direction is larger than an optical magnification of the prism in the first direction,
a first intermediate imaging position where a first direction component of the light flux of the laser light forms a first intermediate image in the prism is located closer to the exit surface than a second intermediate imaging position where a second direction component of the light flux of the laser light forms a second intermediate image in the prism,
a focal length of the prism with respect to the second direction component of the light flux of the laser light that forms the second intermediate image in the prism is longer than a focal length of the prism with respect to the first direction component of the light flux of the laser light that forms the first intermediate image in the prism, so that the first intermediate image is not formed at the second intermediate imaging position and the second intermediate image is not formed at the first intermediate imaging position.

2. An optical system comprising:
a prism having an incident surface, an exit surface, and one or more reflecting surfaces;
a laser element configured to emit a laser light,
a first scanning element configured to scan the laser light emitted by the laser element in a first direction and emit to the incident surface of the prism,
a second scanning element disposed at a position where the laser light scanned by the first scanning element is emitted from the exit surface of the prism and concentrated, and configured to scan the laser light incident from the exit surface of the prism in the second direction,
wherein
a long diameter direction of a pupil diameter of the laser light emitted from the laser element corresponds to the first direction of the first scanning element,
a short diameter direction of the pupil diameter of the laser light emitted from the laser element corresponds to the second direction of the second scanning element,
the long diameter direction and the short diameter direction are orthogonal to each other,
the reflecting surfaces have different curvatures depending on a scanning direction of the first and the second scanning elements so that the pupil diameter of the laser light in the second direction approaches the pupil diameter in the first direction at the exit surface,
an optical magnification of the prism in the second direction is larger than an optical magnification of the prism in the first direction,
a first intermediate imaging position where a first direction component of a light flux of the laser light forms a first intermediate image, and
a focal length of the prism with respect to the first direction component of the light flux of the laser light that forms the first intermediate image in the prism is different from a focal length of the prism with respect to a second direction component of the light flux of the laser light, so that the pupil diameter of the second direction of the light flux of the laser light gradually increases as the light flux of the laser light approaches the exit surface without forming a second intermediate image of the second direction component of the light flux of the laser light.

3. The optical system according to claim 1, wherein the prism is disposed in an optical path from the first scanning element to the second scanning element.

4. The optical system according to claim 1, wherein the reflecting surface of the prism is eccentric with respect to an incident light.

5. The optical system according to claim 1, wherein the prism has at least two of the reflecting surfaces that have a concave shape with respect to an incident light.

6. The optical system according to claim 1, wherein the pupil diameter of the laser light at the first intermediate imaging position has a straight line shape when viewed as extending in the second direction, and the pupil diameter of the laser light at the second intermediate imaging position has a straight line shape when viewed as extending in the first direction.

7. The optical system according to claim 1, wherein the first intermediate imaging position is formed after the laser light is reflected by the reflecting surface.

8. The optical system according to claim 1, wherein the pupil diameter of the laser light exiting from the exit surface is formed in a circular shape.

9. The optical system according to claim 7, wherein a first exit pupil diameter $\varphi x1$ in the first direction and a second exit pupil diameter $\varphi y1$ in the second direction of the pupil diameter of the laser light emitted from the laser element, and a first projection pupil diameter $\varphi x2$ in the first direction and a second projection pupil diameter $\varphi y2$ in the second direction of the laser light on a projection surface after passing through the exit surface of the prism have a relationship of $$0.1 < (\varphi x1 \times \varphi y1)/(\varphi x2 \times \varphi y2) < 0.8.$$

10. The optical system according to claim 3, comprising: an astigmatism correcting element implemented with the prism in an optical path.

11. The optical system according to claim 10, wherein the astigmatism correcting element has a refractive power in the second direction in a pupil diameter of the incident laser light larger than a refractive power in the first direction in a pupil diameter of the incident laser light.

12. The optical system according to claim 10, wherein the astigmatism correcting element has a cylindrical shape, a toroidal shape, a free-form surface shape, or a combination of these shapes.

13. The optical system according to claim 12, wherein the astigmatism correcting element is a lens.

14. The optical system according to claim 12, wherein the astigmatism correcting element is a mirror.

15. The optical system according to claim 12, comprising: a diopter correcting element is disposed on the optical path before the light enters to or after the light exits from the prism.

16. The optical system according to claim 15, wherein the diopter correcting element has a rotationally symmetric refractive power.

17. The optical system according to claim 1, wherein the diopter correcting element is disposed on an optical path from the laser element to the first scanning element.

18. The optical system according to claim 16, wherein the diopter correcting element is a spherical lens or an aspherical lens.

19. The optical system according to claim 10, wherein the reflecting surface of the prism is eccentric with respect to an incident light.

20. An optical system concentrating a laser light scanned by a first scanning element at the position of a second scanning element between the first scanning element configured to scan the laser light emitted by a laser element in a first direction and the second scanning element configured to scan the laser light in a second direction, the optical system comprising:
  a prism having an incident surface, an exit surface, and one or more reflecting surfaces, wherein
  a long diameter direction of a pupil diameter of the laser light incident on the prism corresponds to the first direction of the first scanning element,
  a short diameter direction of the pupil diameter of the laser light incident on the prism corresponds to the second direction of the second scanning element,
  the long diameter direction and the short diameter direction are orthogonal to each other,
  the reflecting surfaces have different curvatures depending on a scanning direction of the first and the second scanning elements so that the pupil diameter of the laser light in the second direction approaches the pupil diameter in the first direction at the exit surface,
  an optical magnification of the prism in the second direction is larger than an optical magnification of the prism in the first direction,
  a first intermediate imaging position where a first direction component of the light flux of the laser light forms a first intermediate image in the prism is located closer to the exit surface than a second intermediate imaging position where a second direction component of the light flux of the laser light forms a second intermediate image in the prism,
  a focal length of the prism with respect to the second direction component of the light flux of the laser light that forms the second intermediate image in the prism is longer than a focal length of the prism with respect to the first direction component of the light flux of the laser light that forms the first intermediate image in the prism, so that the first intermediate image is not formed at the second intermediate imaging position and the second intermediate image is not formed at the first intermediate imaging position.

* * * * *